United States Patent [19]

Huber et al.

[11] Patent Number: 5,284,902
[45] Date of Patent: Feb. 8, 1994

[54] FABRIC REPELLENT TREATMENT FROM HYDROCARBON SOLVENT SYSTEM

[75] Inventors: Charles D. Huber, Oakdale; Richard J. Grant, Maplewood; Richard S. Smith, Mendota Heights, all of Minn.

[73] Assignee: Minnesota Mining and Manufacturing Company, St. Paul, Minn.

[21] Appl. No.: 817,270

[22] Filed: Jan. 3, 1992

[51] Int. Cl.$^5$ .................... C08F 20/22; C08F 222/18
[52] U.S. Cl. ............................ 524/544; 524/307; 524/316; 526/242; 526/243; 526/244; 526/245; 526/246; 526/247; 428/96; 428/392; 428/396; 428/395; 428/421
[58] Field of Search ............ 524/544, 307, 316; 428/96, 392, 394, 395, 421; 526/242, 244, 245, 246, 247

[56] References Cited

U.S. PATENT DOCUMENTS

| | | | |
|---|---|---|---|
| 2,803,615 | 8/1957 | Albrecht et al. | 260/29.6 |
| 3,236,672 | 2/1966 | Shane et al. | 106/287 |
| 3,341,497 | 9/1967 | Sherman et al. | 260/72 |
| 3,698,856 | 10/1972 | Pittman et al. | 524/544 |
| 3,920,614 | 11/1975 | Kirimoto et al. | 524/544 |
| 4,264,484 | 4/1981 | Patel | 260/29.6 |
| 4,366,300 | 12/1982 | Delescluse | 526/245 |
| 4,401,780 | 8/1983 | Steel | 524/225 |
| 4,426,476 | 1/1984 | Chang | 524/316 |

*Primary Examiner*—Paul R. Michl
*Assistant Examiner*—Olga Asinovsky
*Attorney, Agent, or Firm*—Gary L. Griswold; Walter N. Kirn; Robert W. Sprague

[57] ABSTRACT

The present invention comprises a flourochemical composition exhibiting water and oil repellency properties which is soluble in an a hydrocarbon solvent system which is non-halogenated or substantially free of halogens and strong carbonyl solvents.

51 Claims, No Drawings

FABRIC REPELLENT TREATMENT FROM HYDROCARBON SOLVENT SYSTEM

FIELD OF THE INVENTION

The present invention relates to the field of textile treatments utilizing a fluorochemical composition to treat textiles. In particular, it relates to a fluorochemical composition soluble in a hydrocarbon solvent system which is non-halogentated or substantially non-halogenated.

BACKGROUND OF THE DISCLOSURE

It is common to treat the surface of a textile with a composition to make the textile oil repellent, water repellent and resistant to soil. Fluorochemical compositions are commercially available for this purpose. Various patents disclose a variety of such compositions.

For example, U.S. Pat. No. 2,803,615 (Ahlbrecht et al.) discloses a class of acrylate or methacrylate esters of N-alkyl, N-alkanol perfluoroalkanesulfonamides used to impart both repellency to water and resistance to absorption and soiling by oily and greasy materials. U.S. Pat. No. 3,236,672 (Shane et al.) discloses an oil and water repellent consisting of an alkylene imine compound and a perfluoro alkyl acrylate also useful to impart water and oil repellency.

Traditionally, the fluorochemical compositions used for oil and water repellency are dissolved in strong organic solvents. Chlorinated solvents such as trichloroethylene, perchloroethylene and 1,1,1 trichloroethane are used to dissolve fluorochemical compositions in U.S. Pat. No. 4,366,300 (Delescluse), U.S. Pat. No. 3,341,497 (Sherman) and U.S. Pat. No. 4,401,780 (Steel). However, due to the adverse effects of chlorinated hydrocarbons on the Earth's ozone layer, these solvents are no longer desirable.

Delescluse also teaches the use of strong carbonyl containing solvents such as ketones and esters used as solvents for fluorochemical compositions. The ketones disclosed by Delescluse include methylethylketone and the esters include ethyl acetate, butyl acetate and amyl acetate. These solvents are undesirable due to their toxicity and odor. In addition, these solvents can damage materials such a fabrics to which they contact. Damage can include dye bleed and even disintegration of the material.

Sherman teaches the use of a third class of solvents which are neither halogenated solvents nor strong carbonyl solvents. The solvents disclosed by Sherman include xylene. Aromatic solvents are undesirable because of their toxicity. In addition, Sherman uses these solvents in combination with a fluorochemical composition comprising: (1) about 2 to about 50 percent by weight of monomeric units of $R_fP$ where $R_f$ is a perfluorocarbon radical-containing at least 4 carbon atoms and P is a polymerizable group containing terminally ethylenic unsaturation, (2) about 1 to about 25 percent by weight of a monomer containing a functional grouping containing either amide, amine, urea or hydroxyl group reactable with formaldehyde and (3) about 25 to about 97 percent by weight of a terminally ethylenically unsaturated monomer free of active hydrogen and non-vinylic fluorine such as acrylic and esters thereof. A drawback associated with Sherman's fluorochemical composition is that it is insoluble in nonhalogenated solvents when it contains fluorine in amounts greater than 40 percent by weight.

Delescluse discloses yet another type of solvent, useful to dissolve fluorocarbon compositions. The fourth type of solvent comprises aliphatic hydrocarbons which include gasoline and white spirit. Delescluse teaches the use of this group of solvents in conjunction with a liquid composition comprising 89 to 99.5% by weight solvent, 0.1 to 1% by weight fluorinated resin and 0.4 to 10% by weight adjuvant. The adjuvants, which include thermoplastic resins, waxes and aminoplast resins based on melamine, are utilized by Delescluse as binder resins. Binder resins can be defined as substances used to distribute the fluorochemical composition throughout a coating and to afford adhesion to the substrate onto which the fluorochemical composition is applied.

Thus, there currently exists a need for a fluorochemical composition which does not utilize a binder resin in a hydrocarbon solvent system and which is soluble in a solvent system which is non-halogenated or substantially non-halogenated and which is substantially free of strong carbonyl solvents.

SUMMARY OF THE INVENTION

The present invention involves a fluorochemical composition which imparts a desirable combination of properties to textiles treated with the composition including good oil and water repellency. In addition, the fluorochemical composition is soluble in a hydrocarbon solvent system which is non-halogenated or essentially non-halogenated and substantially free of strong carbonyl solvents.

The composition comprises: (1) a copolymer of (a) at least one fluoroaliphatic radical-containing monomer and at least one acrylate or methacrylate monomer and (b) at least one fluoroaliphatic radical-containing ester.

Preferably, the fluorochemical mixture comprises from about 98 to about 99.5% by weight hydrocarbon solvent system and from about 0.5 to about 2% by weight of said composition.

The fluoroaliphatic composition of the present invention preferably comprises from about 70 to about 90 percent by weight copolymer and from about 10 to about 30 percent by weight fluoroaliphatic containing ester.

In a preferred embodiment of the present invention an adjuvant is added to the fluorochemical mixture. If an adjuvant is added to fluorochemical mixture, it is preferred that the fluorochemical composition comprise from about 60 to about 90 by weight fluoroaliphatic containing polymer, from about 5 to about 30 by weight fluoroaliphatic containing ester and an adjuvant comprising up to 15% by weight of said mixture.

The present invention also includes the method of treating textiles comprising the steps of contacting a surface of a textile with the fluorochemical mixture and then drying the mixture, as well as the textiles so treated.

DETAILED DESCRIPTION

The current invention involves a fluorochemical mixture used as a fabric protector which comprises a fluorochemical composition soluble in a non-halogenated or a substantially non-halogenated hydrocarbon solvent system. In addition, the fluorochemical composition is soluble in a hydrocarbon solvent system which is substantially free of strong carbonyl solvents such as esters and ketones.

The first component of the fluorochemical composition comprises a copolymer made of a fluoroaliphatic radical-containing monomer and an acrylate or methacrylate comonomer.

The fluoroaliphatic radical-containing monomer of the fluorochemical composition has the following formula:

$$R_f P$$

where $R_f P$ is a fluorinated, preferably saturated, monovalent non-aromatic, aliphatic radical of at least three fully fluorinated carbon atoms; and P is a polymerizable group.

The chain of $R_f P$ can be straight, branched or if sufficiently large, cyclic and can be interrupted by divalent oxygen atoms or trivalent nitrogen atoms bonded to carbon atoms. A fully fluorinated $R_f$ radical is preferred, but hydrogen or chlorine atoms may be present as substituents in $R_f$ provided that not more than one atom of either is present in $R_f$ for every two carbon atoms and that $R_f$ must at least contain a terminal trifluoromethyl group. Preferably, $R_f$ contains not more than 20 carbon atoms because such a large radical results in inefficient use of the fluorine content.

The group P preferably is an ethylenically unsaturated moiety which is polymerizable by free radical initiation, electron beam irradiation, ionic initiation or the like. P can also be a radical or a dicarboxylic acid, glycol and the like which is copolymerizable with a radical or an appropriate comonomer selected, for example, from organic diisocyanates, diaryl halides and the like or other combinations apparent to those skilled in the art.

$R_f P$ preferably contains at least 20 weight percent carbon-bound fluorine.

Preferably, $R_f P$ is a fluoroaliphatic acrylate or methacrylate monomer. Examples of suitable monomers include:

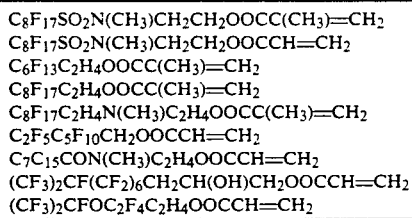

and mixtures thereof.

A second compatible monomer is copolymerized with the $R_f P$ monomer to form the fluoroaliphatic radical-containing copolymer of this invention. Fluoroaliphatic copolymer compositions are selected such that they are soluble in substantially non-halogenated hydrocarbon solvent systems. They are also selected so that they are soluble in solvent systems which are substantially free of ketones and esters. This requirement is met by incorporating at least 20 parts by weight and preferably about 35 parts or more by weight of an alkyl acrylate or methacrylate ester comonomer.

Suitable comonomers include linear or branched acrylate or methacrylate esters, the alkyl groups of which have from about 8 to about 18 carbon atoms. Examples of such comonomers include n-octyl acrylate, n-octyl methacrylate, 2-ethylhexyl acrylate, 2-ethylhexyl methacrylate, isooctyl acrylate, n-nonyl acrylate, n-nonyl methacrylate, n-decyl acrylate, n-decyl methacrylate, iso-decyl methacrylate, undecyl methacrylate, lauryl acrylate, lauryl methacrylate, hexadecyl acrylate, hexadecyl methacrylate, and stearyl methacrylate. (octadecyl methacrylate).

The second component of the fluorochemical composition comprises an ester of a fluorochemical alcohol. Both carbamate and simple esters can be used. The simple esters can be prepared by reacting precursor fluoroaliphatic radical-containing alcohols with an organic acid such as a mono- or dicarboxylic acid. The carbamate esters which are commonly referred to as urethanes can be prepared by reacting the alcohols or said simple esters if they contain an isocyanate-reactive hydrogen atom, with an organic isocyanate. The fluoroaliphatic radical-containing esters are described in greater detail in U.S. Pat. No. 4,264,484 which is herein incorporated by reference.

The fluoroaliphatic radical-containing esters are compounds which preferably are free of anionic, nonionic or cationic groups.

The fluorinated radical of said esters, identified herein as $R_f'$ is a fluorinated, preferably saturated, monovalent, nonaromatic aliphatic radical of at least 3 fully fluorinated carbon atoms. The chain of $R_f'$ can be straight or cyclic and can be interrupted by divalent oxygen atoms or trivalent nitrogen atoms bonded only to the carbon atoms. A fully fluorinated $R_f'$ radical is preferred, but hydrogen or chorine atoms may be present as substituents in $R_f'$ provided that not more than one atom of either is present in $R_f'$ for every two carbon atoms and that $R_f'$ must contain at least a terminal trifluoromethyl group. Preferably, $R_f'$ contains not more than 20 carbon atoms because such a large radical results in inefficient use of the fluorine content.

The aforementioned esters can be prepared by conventional esterification techniques through reaction of the various above-described alcohols with mono-or polycarboxylic acids and acid anhydrides. These techniques are disclosed in U.S. Pat. No. 4,264,484 incorporated herein by reference.

Suitable acids include acetic acid, deltachlorovaleric acid, octanoic acid, decanoic acid, lauric acid, palmitic acid, oleic acid, linoleic acid, linolenic acid, malonic acid, benzylmalonic acid, succinic acid, hydroxysuccinic acid, adipic acid, suberic acid, azelaic acid, sebacic acid, dodecanoic acid, tridecanedoic acid, maleic acid, dibromomaleic anhydride, dichloromaleic anhydride, itaconic acid, d,1-camphoric acid, phthalic acid, phthalic anhydride, citric acid, and trimesic acid. Esters of adipic acid (i.e., adipates) and of phthalic acid (i.e., phthalates) are preferred simple esters for use in the present invention. Particularly preferred simple esters are prepared by reacting adipic acid with the reaction product of epichlorohydrin and fluoroaliphatic radical-containing alcohol $C_8F_{17}SO_2N(CH_3)C_2H_4OH$ following the procedure of Example 8 of U.S. Pat. No. 4,264,484. The resulting simple ester has the formula:

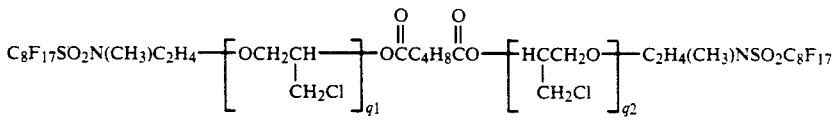

where $q_1 + q_2$ is 1 or more.

When the fluoroaliphatic radical esters of this invention are carbamate esters, they can be prepared by conventional urethane bonding reactions as those disclosed in U.S. Pat. No. 3,923,715. The carbamate esters are most readily prepared by the reaction of the aforementioned precursor alcohols or the simple esters if the latter contain an isocyanate-reactive hydrogen atom with an organic isocyanate such as 2,4-tolylene diisocyanate. Other aromatic, aliphatic or alicyclic isocyanates can be substituted for 2,4-tolylene diisocyanate on an isocyanate equivalent basis, such as 2,6-tolylene diisocyanate, isophorone diisocyanate, hexamethyl diisocyanate, hexamethylene diisocyanate trimer and mixtures thereof. When mixtures of isocyanates are used, the component isocyanates of the mixture can be reacted sequentially with the precursor alcohol or reactive simple ester or the mixture of isocyanates as such can be reacted therewith. A single precursor alcohol or reactive simple ester can be reacted with the isocyanate(s), or mixtures of precursor alcohols, reactive simple esters or precursor alcohol and reactive simple ester can be reacted with the isocyanates. The reaction mixture can also contain alcohols free of fluoroaliphatic radicals or free of aliphatic chlorine radicals. It is preferred that the precursor alcohols and reactive simple esters be free of aliphatic unsaturation, although aromatic substituents can be present provided the alcoholic hydroxyl group is bonded to an aliphatic carbon atom.

A class of carbamate esters useful in this invention can be represented by the formula:

where R is the isocyanate-free residue of an organic polyisocyanate, B is the hydroxyl-free residue of one or more of the above-described precursor alcohols, and r is an integer equal to the number of isocyanate groups in the polyisocyanate, e.g., 2 to 5.

A number of solvent systems can be used in conjunction with the fluoroaliphatic radical-containing copolymer and ester of this invention as long as the solvent is a hydrocarbon solvent which is essentially non-halogenated and substantially free of strong carbonyl solvents such as ketones and esters. Such solvents are undesirable because of their adverse effects upon the Earth's atmosphere and because of their toxicity. In addition, it is preferred that the hydrocarbon solvent system of the present invention not impart a maleferious odor.

The hydrocarbon solvent systems of the present invention preferably should have a solubility parameter of less than 8 $(cal/cm^3)^{\frac{1}{2}}$. Solvents having solubility parameters greater than 8 may have the undesirable properties of solvent systems comprising substantially halogenated hydrocarbon solvents. They also may have the toxicity of solvent systems comprising primarily strong carbonyl solvents. In addition, solvents with these parameters may damage fabric. Therefore, the hydrocarbon solvent system of the present invention should have no more than 0.5% halogenated hydrocarbon solvent and should have less than 3% strong carbonyl solvent such as ester or ketone. Most preferably, there should be neither halogenated hydrocarbon solvent nor strong carbonyl solvent in the hydrocarbon solvent system of the present invention. Suitable hydrocarbon solvents include petroleum distallates, mineral spirits, white spirits, naphtha, stoddard solvents and paraffinic and isoparaffinic hydrocarbon solvents. If desired, adjuvants can be added to enhance certain aspects of performance of the fluorochemical textile treatments such as water repellency or durability of treatment. Suitable adjuvants include hydrophobic extenders. For example, cyclic ethylene imines also known as aziridines can be added to the fluorochemical composition of the present invention. Aziridines can be represented by the formula:

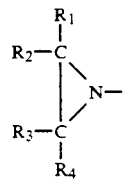

where $R_1$, $R_2$, $R_3$, and $R_4$ are generally H, or lower alkyl, e.g., 1 to 6 carbon atoms. Aziridine compounds useful in this invention include monofunctional and polyfunctional aziridines. Specific examples of aziridine compounds useful as adjuvants include, but are not limited to, β-aziridinylmethyl methacrylate, N-cyanoethylethylene-imine, octadecylethyleneurea, trimethylolpropanetris-[3-(1-aziridinyl)butyrate], trimethylolpropane[3-(1-(2-methyl)aziridinyl) propionate], trimethylolpropanetris[3-(1-aziridinyl)-2-methyl propionate], diphenylmethane-4,4'-bis-N,N'-ethyleneurea, pentaerythritoltris[3-(1-aziridinyl-propionate], and the like. A specifically suitable aziridine is prepared by reacting dimer acid diisocyanate and propylene imine in a stoichiometric ratio in a suitable solvent which is inert to the starting materials, such as ethers, esters, hydrocarbons, halogenated solvents and mixtures thereof. The reaction product is depicted as follows, where R equals about 36 carbon residue from the dimer acid diisocyanate.

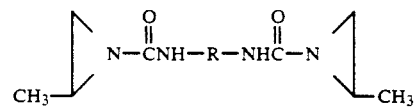

Suitable aziridines can be obtained from Lindley Chemical Inc. under the tradename LINTEX FC-67 or from Sandoz Chemical Company under the tradename HyAd-HF.

The fluorochemical mixture of the present invention can be prepared by adding a solution of the copolymer comprising a fluoroaliphatic radical-containing monomer and an acrylate monomer dissolved in an organic solvent such as ethyl acetate and heptane to a solution of fluoroaliphatic radical-containing ester dissolved in an organic solution such as propylene glycol methyl ether acetate. If an adjuvant is desired, it can be added to the copolymer-ester mixture. After these steps are completed, the hydrocarbon solvent system is added.

The amount of each component can vary over a broad range and is selected to provide the desired balance of oil and water resistance on the textile which is desired to be treated. In general, as the amount of the fluorochemical copolymer is increased, the water resistance increases and as the amount of fluoroaliphatic ester is increased, the oil resistance increases.

In order to obtain an optimum balance of properties, it is preferred that the fluoroaliphatic composition of the present invention should comprise from about 70 to about 90 percent by weight copolymer and from about 10 to about 30 percent by weight fluoroaliphatic containing ester.

If adjuvant is added to fluorochemical mixture, it is preferred that the fluorochemical composition comprise from about from about 60 to about 90 percent by weight fluoroaliphatic containing polymer, from about 5 to about 30 percent by weight fluoroaliphatic containing ester and an adjuvant comprising up to 15% by weight of the composition. In a preferred embodiment, the fluoroaliphatic composition should comprise 65 to about 80 weight percent copolymer, 10 to about 25 weight percent ester and 5 to about 15 weight percent adjuvant. Most preferably, the fluoroaliphatic composition should comprise 70 weight percent copolymer, 20 weight percent ester and 10 weight percent adjuvant.

The amount of the hydrocarbon solvent system in the mixture varies according to use. For optimum results, the hydrocarbon solvent should comprise from about 98 to about 99.5% by weight of said fluorochemical mixture. Most, preferably, it should comprise 99% by weight of the fluorochemical mixture.

The fluorochemical compositions of this invention can be applied to articles such as textile fabrics, nonwoven webs, single fibers, carpets and the like made of natural materials such as wool, cotton, cellulose and leather or synthetic materials such as nylons, acrylics, olefins, polyesters, blends and the like.

Application of the compositions of the invention can be by customary procedures such as spraying, padding, exhaustion, foam application, roll-coating and the like. For use as a consumer product, the fluorochemical mixture can be supplied in a pressurized aerosol can.

Once applied, the fluorochemical mixture dries at room temperature. If desired, the fluorochemical mixture can be dried by heating.

TEST METHODS

Oil Repellency

The oil repellency of fluorochemical treated fabrics is measured by Test Method #118-1966 from the American Association of Textile Chemists (AATCC). The test gives a relative value of the treated sample's oily stain resistance against different oils. It is conducted by placing a drop of test solution gently on the fabric surface and then allowing the drop to remain for 30 seconds. The fabric is then inspected for wetting. A scale of 1 through 8 (criteria shown in Table 1) is used to rate the fabric. The rating is based on the highest number oil which does not wet fabric. Higher numbers indicate better oil repellency. In general, an oil repellency of 6 or higher is desired.

TABLE 1

| Oil Repellency Rating | Test Solution |
|---|---|
| | AATCC TM-118-1966 |
| 8 | n-Heptane |
| 7 | n-Octane |
| 6 | n-Decane |
| 5 | n-Dodecane |
| 4 | n-Tetradecane |
| 3 | n-Hexadecane |
| 2 | 35/65 mix of n-Hexadecane/Nujol |
| 1 | Nujol (mineral oil) |

Abraded Oil Repellency

The Abraded Oil Repellency Test also gives a relative value of the treated samples' oily stain resistance and durability of treatment. However, in this test method, the treated fabric sample is first placed on an AATCC Crockmeter and subjected to 20 cycles of rubbing abrasion using a 1.6 cm disc of grade 600 3M WETORDRY TM TRIMITE TM abrasive paper (available from Minnesota Mining and Manufacturing Co.). After being the subjected to the abrasion, the test sample is tested in the same manner as in the Oil Repellency Test. In general, a value of 3 or above is desired.

Water Spray Test

The water repellency of the samples was measured by AATCC Test Method #22. The sample is rated for water repellency as determined by the pattern of surface wetting as described in Table 2. In the test, the sample is held taut at a 45° degree angle and 250 ml of water at a temperature of 27° C. is dropped onto the sample from a distance of 15.2 cm above the center of the sample. After all of the water has fallen, the sample is tapped lightly to remove excess water and rated according to Table 2. A higher number indicates better water repellency. In general, a number of 70 or above is desirable.

TABLE 2

| Rating | Degree of Water Repellency |
|---|---|
| 100 | No wetting of the surface |
| 90 | Wetting of the surface in a few small spots |
| 80 | Wetting of the surface in 6–15 separate spots |
| 70 | Wetting of the surface by connected spots |
| 50 | Full wetting of surface in center of fabric |
| 0 | Complete wetting of entire fabric surface |

Wet Through Rating

The samples are also rated for wet through, the amount of moisture which comes through a sample after it is wetted. The test is conducted in accordance with the procedures of the water spray test. A rating is based by immediate observation and feel of the backside of a test sample after completing the water spray test procedure. The sample is measured using the following rating system: "W"-significant wet through; "S"-slight wetting or dampness; "N"-no wet through or dampness. In general, a rating of "S" or "N" is desirable.

TEST SAMPLES

The samples used in the examples and comparative examples were prepared by spraying a 20.3 cm by 22.9 cm piece of test fabric with various fluorochemical mixtures. After spraying, the samples were dried for about 24 hours at 20° C. before testing. The fabrics used in the test was cotton (#428 cotton sateen, desized and bleached), and polyester/cotton-PET/Cot (#7436 polyester/cotton (65/35) poplin, bleached). Both fabrics were obtained from Testfabrics, Inc., Middlesex, N.J.

EXAMPLE 1

The test sample of Example 1 was prepared in the following manner:

First, the copolymer (A) of the fluoroaliphatic radical and acrylate monomer was prepared by dissolving 65 parts (by weight) of N-methyl perfluorooctanesulfonamidoethyl methacrylate and 35 parts of octadecyl methacrylate in 300 parts of a solvent blend comprising 1 part ethyl acetate to 2 parts heptane in a reactor. Next, 2 parts (by weight of the monomers) of 2,2'-azobis(2-methylpropanenitrile) were added to this solution. The reactor was then purged with nitrogen and the mixture was heated to a temperature of 65° C. for 16 hours. The mixture was stirred constantly. The resulting solution had a solids content of 25%. The fluoroaliphatic radical-containing ester (B) was prepared by dissolving 10 grams of the following ester:

to the test procedures described above. The test results are reported in Table 3.

EXAMPLES 2–7 AND COMPARATIVE EXAMPLES C1–C4

Examples 2–7 and Comparative Examples C1–C4 were prepared and tested in the same manner as described in Example 1. The weight ratios of the fluorochemical compositions of the examples and comparative examples are reported in Table 3.

TABLE 3

| | Solids Composition by wt % | | | Repellency Test Results | | | | |
|---|---|---|---|---|---|---|---|---|
| | | | | | | | Repellency Test | |
| Ex. | A | B | C | Fabric Type | Oil Test | Abraded Oil Test | Water Spray Test | Water Wet Through |
| 1 | 70 | 20 | 10 | Cotton | 7.0 | 4.0 | 80 | N |
| | | | | PET/Cot | 7.0 | 4.0 | 80 | N |
| 2 | 60 | 30 | 10 | Cotton | 7.0 | 6.0 | 80 | N |
| | | | | PET/Cot | 7.0 | 4.0 | 80 | N |
| 3 | 90 | 5 | 5 | Cotton | 6.0 | 3.0 | 80 | N |
| | | | | PET/Cot | 4.0 | 2.0 | 80 | N |
| 4 | 80 | 10 | 10 | Cotton | 6.0 | 5.0 | 80 | N |
| | | | | PET/Cot | 6.0 | 3.0 | 80 | N |
| 5 | 90 | 10 | 0 | Cotton | 6.0 | 3.0 | 70 | N |
| | | | | PET/Cot | 5.0 | 3.0 | 70 | N |
| 6 | 78 | 22 | 0 | Cotton | 5.0 | 4.0 | 70 | S |
| | | | | PET/Cot | 6.0 | 4.0 | 70 | S |
| 7* | 78 | 22 | 0 | Cotton | 6.0 | 4.0 | 70 | N |
| | | | | PET/Cot | 6.0 | 4.0 | 70 | S |
| C1 | 100 | 0 | 0 | Cotton | 3.0 | 2.0 | 80 | S |
| | | | | PET/Cot | 3.0 | 1.0 | 50 | W |
| C2 | 0 | 100 | 0 | Cotton | 6.0 | 5.0 | 50 | W |
| | | | | PET/Cot | 6.0 | 5.0 | 50 | W |
| C3 | 88 | 0 | 12 | Cotton | 5.0 | 2.0 | 80 | N |
| | | | | PET/Cot | 6.0 | 2.0 | 80 | N |
| C4 | 0 | 60 | 40 | Cotton | 5.0 | 5.0 | 50 | W |
| | | | | PET/Cot | 3.0 | 3.0 | 70 | N |

*This sample was diluted to 1% solids with Heptane.

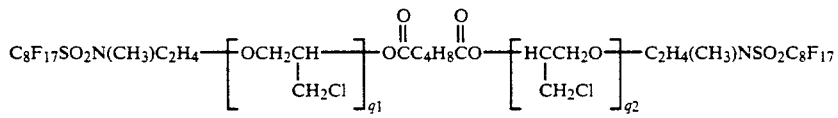

$$C_8F_{17}SO_2N(CH_3)C_2H_4 - [OCH_2CH(CH_2Cl) - OCC_4H_8CO]_{q1} - [HCCH_2O(CH_2Cl)]_{q2} - C_2H_4(CH_3)NSO_2C_8F_{17}$$

in 20 grams of propylene glycol methyl ether acetate resulting in a cloudy solution. The cloudy solution was filtered to produce a clear solution. The clear solution had a solids content of 33%.

The fluorochemical composition was prepared by mixing 74 parts of the solution containing A with 16 parts of the solution containing B. To this mixture was added 10 parts of a 25% solid solution of HyAd-HF. (C)

The resulting fluorochemical composition was diluted to 1% solids with an isoparaffinic hydrocarbon fraction with a flash point of 40° C. (Isopar G available from Exxon Company).

Test samples described above were then treated with the resultant fluorochemical mixture tested according to the test procedures described above.

Samples treated with the compositions of the invention generally performed better than those not treated with the composition of the present invention in the oil test, the abraded oil test, the water spray test and the wet through test. Exclusion of C generally decreased the water repellency of the treated samples yet the samples were still within the acceptable range for both water repellency and oil repellency for fluorochemical compositions used to treat fabrics. However, if either A or B was missing from the fluorochemical composition as illustrated in Comparative Examples C1–C4 the test results were unacceptable for either oil or water repellency. Comparative Examples C1 and C3 indicated that fluorochemical compositions lacking the ester (B) exhibited poor oil repellency. Comparative Examples C2 and C4 indicated that fluorochemical compositions lacking the copolymer (A) indicated poor water repellency. Thus, the Examples show that the effective performance could be obtained with fluorochemical composition of the present invention.

In summary, a novel and unobvious fluorochemical mixture has been described. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims including all equivalents.

We claim:

1. A fluorochemical mixture comprising:
   a. a composition comprising (1) at least one copolymer comprising at least one fluoroaliphatic radical-containing monomer and at least one non-fluorinated acrylate monomer and (2) at least one fluoraliphatic radical-containing ester; and
   b. a hydrocarbon solvent system which is essentially non-halogenated and substantially free of ketones and esters wherein said composition is soluble in said solvent.

2. The fluorochemical mixture of claim 1 comprising from about 98 to about 99.5% by weight of said hydrocarbon solvent system and from about 0.5 to about 2% by weight of said composition.

3. The fluorochemical mixture of claim 2 wherein said copolymer comprises from about 70 to about 90 percent by weight of said composition and said fluoroaliphatic containing ester comprises from about 10 to about 30 percent by weight of said composition.

4. The fluorochemical mixture of claim 1 wherein said composition further comprises an adjuvant.

5. The fluorochemical mixture of claim 4 wherein said adjuvant is an aziridine compound.

6. The fluorochemical mixture of claim 4 wherein said composition comprises from about 60 to about 90 percent by weight of said copolymer, from about 5 to about 30 percent by weight of said fluoroaliphatic containing ester and from about 0 to about to about 15 percent by weight of said adjuvant.

7. The hydrocarbon solvent system of claim 1 wherein said solvent system has a solubility parameter less than 8 $(cal/cm^3)^{\frac{1}{2}}$.

8. The fluorochemical mixture of claim 1 wherein said solvent system is non-halogenated.

9. The fluorochemical mixture of claim 1 wherein said fluoroaliphatic radical-containing monomer has the formula $R_fP$, where $R_f$ is a fluorinated, monovalent, non-aromatic, aliphatic radical of at least three fully fluorinated carbon atoms, and P is a polymerizable group and wherein said acrylate is an alkyl acrylate or methacrylate having from about 8 to about 18 carbon atoms.

10. The fluorochemical mixture of claim 9 wherein said fluoroaliphatic radical-containing monomer comprises a fluoroaliphatic acrylate or methacrylate monomer.

11. The fluorochemical mixture of claim 1 wherein said fluoroaliphatic radical-containing ester comprises an ester of a fluoroaliphatic radical-containing alcohol and a mono-or polycarboxylic acid.

12. The fluorochemical mixture of claim 11 wherein said ester comprises an adipate, phthalate or citrate ester.

13. The fluorochemical mixture of claim 1 wherein said ester comprises a carbamate ester of a fluoroaliphatic alcohol and an organic isocyanate.

14. A method of treating a textile comprising the steps of:
   a. contacting said textile with a fluorochemical mixture comprising:
      1. a composition comprising (1) at least one copolymer comprising at least one fluoroaliphatic radical-containing monomer and at least non-fluorinated one acrylate monomer and (2) at least one fluoroaliphatic radical-containing ester; and
      2. a hydrocarbon solvent system which is essentially non-halogenated and substantially free of ketones and esters wherein said composition is soluble in said solvent; and
   b. drying said contacted textile.

15. The method of claim 14 wherein said fluorochemical mixture comprises from about 98 to about 99.5% by weight of said hydrocarbon solvent system and from about 0.5 to about 2% by weight of said composition.

16. The method of claim 15 wherein said copolymer comprises from about 70 to about 90 percent by weight of said composition and said fluoroaliphatic containing ester comprises from about 10 to about 30 percent by weight of said composition.

17. The method of claim 14 wherein said composition further comprises an adjuvant.

18. The method of claim 17 wherein said adjuvant comprises an aziridine compound.

19. The method of claim 17 wherein said composition comprises from about 60 to about 90 percent by weight of said copolymer, from about 5 to about 30 percent by weight of said fluoroaliphatic containing ester and from about 0 to about to about 15 percent by weight of said adjuvant.

20. The method of claim 14 wherein said hydrocarbon solvent system has a solubility parameter less than 8 $(cal/cm^3)^{\frac{1}{2}}$.

21. The method of claim 14 wherein said solvent system is non-halogenated.

22. The method of claim 14 wherein said fluoroaliphatic radical-containing monomer has the formula $R_fP$, where $R_f$ is a fluorinated, monovalent, non-aromatic, aliphatic radical of at least three fully fluorinated carbon atoms, and P is a polymerizable group and wherein said acrylate comprises an alkyl acrylate or methacrylate having from about 8 to about 18 carbon atoms.

23. The method of claim 22 wherein said first fluoroaliphatic radical-containing monomer comprises a fluoroaliphatic acrylate or methacrylate monomer.

24. The method of claim 14 wherein said fluoroaliphatic radical-containing ester comprises an ester of a fluoroaliphatic radical-containing alcohol and a mono- or polycarboxylic acid.

25. The method of claim 24 wherein said ester comprises an adipate, phthalate or citrate ester.

26. The method of claim 14 wherein said ester comprises a carbamate ester of a fluoroaliphatic alcohol and an organic isocyanate.

27. A textile treated with a fluorochemical mixture comprising:
   a. a composition comprising (1) at least one copolymer comprising at least one fluoroaliphatic radical-containing monomer and at least one non-fluorinated acrylate monomer and (2) at least one fluoraliphatic radical-containing ester; and
   b. a hydrocarbon solvent system which is essentially non-halogenated and substantially free of ketones and esters wherein said composition is soluble in said solvent.

28. The textile of claim 27 wherein said fluorochemical mixture comprises from about 98 to about 99.5% by weight of said hydrocarbon solvent system and from about 0.5 to about 2% by weight of said composition.

29. The textile of claim 28 wherein said copolymer comprises from about 70 to about 90 percent by weight of said composition and said fluoroaliphatic containing ester comprises from about 10 to about 30 percent by weight of said composition.

30. The textile of claim 27 wherein said composition further comprises an adjuvant.

31. The textile of claim 30 wherein said adjuvant comprises an aziridine compound.

32. The textile of claim 30 wherein said composition comprises from about 60 to about 90 percent by weight of said copolymer, from about 5 to about 30 percent by weight of said fluoroaliphatic containing ester and from about 0 to about to about 15 percent by weight of said adjuvant.

33. The textile of claim 27 wherein said hydrocarbon solvent system has a solubility parameter less than 8 $(cal/cm^3)^{\frac{1}{2}}$.

34. The textile of claim 27 wherein said solvent system is non-halogenated.

35. A fluorochemical composition soluble in a hydrocarbon solvent system which is essentially non-halogenated and free of ketones and esters comprising:
  (1) a copolymer comprising at least one fluoroaliphatic radical-containing monomer and at least one non-fluorinated acrylate monomer; and
  (2) at least one fluoroaliphatic radical-containing ester.

36. The composition of claim 35 wherein said fluoroaliphatic radical-containing monomer has the formula $R_fP$, where $R_f$ is a fluorinated, monovalent, non-aromatic, aliphatic radical of at least three fully fluorinated carbon atoms and P is a polymerizable group and wherein said acrylate is an alkyl acrylate or methacrylate having from about 8 to 18 carbon atoms.

37. The composition of claim 36 wherein said fluoroaliphatic radical containing monomer comprises a fluoroaliphatic acrylate or methacrylate ester.

38. The composition of claim 35 wherein said fluoroaliphatic radical-containing ester comprises an ester of a fluoraliphatic radical containing alcohol and a mono- or polycarboxylic acid.

39. The composition of claim 38 wherein said ester is selected from the group comprising an adipate, phthalate or citrate ester.

40. The composition of claim 35 wherein said ester comprises a carbamate ester of a fluoraliphatic alcohol and an organic isocyanate.

41. A fluorochemical mixture comprising:
  a. a composition comprising (1) at least one copolymer comprising at least one fluoroaliphatic radical-containing monomer and at least one non-fluorinated acrylate monomer and (2) at least one fluoraliphatic radical-containing ester; and
  b. a hydrocarbon solvent system having a solubility parameter of less than about 8 $(cal/cm^2)^{\frac{1}{2}}$ wherein said composition is soluble in said solvent.

42. The composition of claim 41 wherein said fluoroaliphatic radical-containing monomer has the formula $R_fP$, where $R_f$ is a fluorinated, monovalent, non-aromatic, aliphatic radical of at least three fully fluorinated carbon atoms and P is a polymerizable group and wherein said acrylate is an alkyl acrylate or methacrylate having from about 8 to 18 carbon atoms.

43. The composition of claim 42 wherein said fluoraliphatic radical containing monomer comprises a fluoraliphatic acrylate or methacrylate ester.

44. The composition of claim 41 wherein said fluoraliphatic radical-containing ester comprises an ester of a fluoraliphatic radical containing alcohol and a mono- or polycarboxylic acid.

45. The composition of claim 44 wherein said ester is selected from the group comprising an adipate, phthalate or citrate ester.

46. The composition of claim 41 wherein said ester comprises a carbamate ester of a fluoraliphatic alcohol and an organic isocyanate.

47. The fluorochemical mixture of claim 41 comprising from about 98 to about 99 percent by weight of said hydrocarbon solvent system and from about 0.5 to about 2 percent by weight of said composition.

48. The fluorochemical mixture of claim 42 wherein said copolymer comprises from about 70 to about 90 percent by weight of said composition and said fluoroaliphatic containing ester comprises from about 10 to about 30 percent by weight of said composition.

49. The fluorochemical mixture of claim 41 further comprising an adjuvant.

50. The fluorochemical mixture of claim 44 wherein said composition comprises from about 60 to about 90 percent by weight of said copolymer, from about 5 to about 30 percent by weight of said fluoroaliphatic containing ester and from about 0 to about 15 percent by weight of said adjuvant.

51. The fluorochemical mixture of claim 41 wherein said solvent system is non-halogenated.

* * * * *